(12) United States Patent
Ishii

(10) Patent No.: US 8,337,973 B2
(45) Date of Patent: Dec. 25, 2012

(54) STRUCTURE OF CYLINDRICAL BOSS FORMING PLACE OF CABINET

(75) Inventor: Hiroki Ishii, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 406 days.

(21) Appl. No.: 12/688,205

(22) Filed: Jan. 15, 2010

(65) Prior Publication Data

US 2010/0178465 A1    Jul. 15, 2010

(30) Foreign Application Priority Data

Jan. 15, 2009  (JP) .............. P.2009-006836

(51) Int. Cl.
*B32B 7/00* (2006.01)
*B32B 3/00* (2006.01)
*F16B 12/00* (2006.01)

(52) U.S. Cl. ........ 428/119; 428/120; 428/156; 428/213; 312/111; 312/140; 312/223.1; 24/289

(58) Field of Classification Search .............. 428/119, 428/120, 156, 213; 312/111, 140, 223.1, 312/265; 24/289, 297
See application file for complete search history.

(56) References Cited

U.S. PATENT DOCUMENTS 6,342,286 B1 *   1/2002   Hollingshead et al. ....... 428/120

FOREIGN PATENT DOCUMENTS

| JP | 52-041358 | 3/1977 |
|---|---|---|
| JP | 10-151640 | 6/1998 |
| JP | 11-105058 | 4/1999 |
| JP | 11-123738 | 5/1999 |

OTHER PUBLICATIONS

Rosato, D. V. Ed, *Injection Molding Handbook*, Proceedings of the 1998 IEEE Computer Society Conference on Computer Vision and Pattern Recognition, Jun. 23-25, 1998, pp. 614-615.

* cited by examiner

*Primary Examiner* — Donald J Loney
(74) *Attorney, Agent, or Firm* — Morgan, Lewis & Bockius LLP

(57) ABSTRACT

A structure of a cylindrical boss forming place of a cabinet is provided. A resin-molded plate has a first face which is flat and a second face which is opposite to the first face. A resin-molded boss is formed into a cylindrical shape and is integrally protruded from the second face of the plate. A thickness t of a cylinder wall at a base end of the boss is less than a reference thickness T of the plate. When the plate is divided into a circular-shaped first area partly defining an inner space of the cylindrical boss, a ring-shaped second area disposed to around the first area so as to correspond to the cylinder wall and a peripheral third area disposed to surround the second area, the peripheral third area is formed such that a thickness of the third area is equal to the thickness t of the cylinder wall at an innermost portion, the thickness of the third area increases from the inside to the outside, and the thickness of the third area is equal to the reference thickness T of the plate at an outermost portion, and the circular-shaped first area is formed such that a thickness T1 of the first area is less than 0.6 times the thickness t of the cylinder wall.

5 Claims, 4 Drawing Sheets

STRUCTURE OF CYLINDRICAL BOSS FORMING PLACE OF CABINET

The disclosure of Japanese Patent Application No. 2009-006836 filed on Jan. 15, 2009 including specification, drawings and claims is incorporated herein by reference in its entirety.

BACKGROUND

The present invention relates to a structure of a cylindrical boss forming place of a cabinet.

Various electric devices such as a television receiver and a DVD player comprise a cabinet for accommodating electric components therein. Such a cabinet may be made of resin and formed by an injection molding. A resin molded cylindrical boss may be integrally formed on a back surface of an outer plate of the cabinet. When such a cylindrical boss is integrally formed on the back surface of the outer plate of the cabinet, a "sink" may be generated on a front surface of the outer plate due to the contraction of resin during the molding process. If the sink is generated on the outer plate, especially on the front surface of the outer plate of a front panel, during the molding process, it noticeably deteriorates an external appearance quality, such as premium looking, of the device. Consequently, there have been various measures to prevent the sink from occurring on the surface of the cabinet or to make the sink unnoticeable (see Patent Document 1).

FIG. 4 is an explanatory diagram illustrating a resin molded product including a base plate 1 with a flat front surface and a rib 2 standing on a back surface of the base plate. Generally, in this resin molded product, if the relationship of the following formula (1) is satisfied, a sink does not occur on the front surface of the base plate:

$$a < A \times 0.6 \qquad (1)$$

where "A" denotes a thickness of the base plate 1 and "a" denotes a thickness of the rib 2. This is due to the fact that, under the condition that the relationship of the formula (1) is satisfied, since the cooling speed of the resin in the connecting portion of a base end (a root) of the rib 2 and the base plate 1 is similar to the cooling speed of the resin in the surrounding portion disposed around the connecting portion during the injection molding process, local temperature contraction of the resin hardly occurs. Further, FIG. 4 shows a place where the sink easily occurs and the shape of the sink with dotted lines H, as an example.

Moreover, in the patent document 1, it is described that, in the relationship between the thickness t of a surface with a thickness deviation portion and the width w of the thickness deviation portion on a mold for forming the thickness deviation portion, when an injection molded product satisfying w>0.6 t is molded, the sink is likely to occur.

In the cabinet of the electric device such as a television receiver, the front panel is made to be thin so as to promote weight or cost reduction. On the other hand, a cylindrical boss is integrally formed on the back surface of the outer plate of the thin front panel by the injection molding to reinforce the outer plate by the cylindrical boss. The cylindrical boss is used for fixing the CRT and a liquid crystal module in the cabinet with screws. In the cabinet in which the cylindrical boss is integrally formed on the back surface of the outer plate, depending on the thickness of the outer plate and the thickness of the cylinder wall of the base end of the cylindrical boss, the sink may occur on the front surface of the outer plate, thereby deteriorating the external appearance quality. Particularly, in a cabinet with a high gloss, the sink generated on the outer plate is likely to be noticeable.

Patent Document 1: JP-A-10-151640

In order to prevent the sink from occurring, the thickness of the outer plate and the thickness of the cylinder wall of the base end of the cylindrical boss may be set to satisfy the condition of the formula (1). However, in view of requisition of thin outer plate and required strength of the cylindrical boss, the condition of the formula (1) may not be easily satisfied.

Meanwhile, although the measures to suppress the occurrence of the sink have been performed, mainly, by the mold manufacturer, it is difficult to suppress or prevent the occurrence of the sink on the front surface of the outer plate only by means of the measures of the mold manufacturer.

SUMMARY

It is therefore an object of at least one embodiment of the present invention to suppress or prevent the occurrence of the sink on the front surface of the outer plate at the cylindrical boss forming place of the cabinet by design by taking a temperature contraction state of the resin during the molding process into consideration or by using a theory according to formula (1) in the cylindrical boss forming place, and to provide a structure of the cylindrical boss forming place of the cabinet in which the sink is not noticeable on the front surface of the cabinet even when the cabinet with the high gloss front surface is used.

In order to achieve the above described object, according to an aspect of at least one embodiment of the present invention, there is provided a structure of a cylindrical boss forming place of a cabinet, the structure comprising: a resin-molded plate having a first face which is flat and a second face which is opposite to the first face; and a resin-molded boss formed into a cylindrical shape and integrally protruded from the second face of the plate, wherein: a thickness t of a cylinder wall at a base end of the boss is less than a reference thickness T of the plate, and when the plate is divided into a circular-shaped first area partly defining an inner space of the cylindrical boss, a ring-shaped second area disposed around the first area so as to correspond to the cylinder wall and a peripheral third area disposed so as to surround the second area, the peripheral third area is formed such that a thickness of the third area at an innermost portion is equal to the thickness t of the cylinder wall, the thickness of the third area increases from the inside to the outside, and the thickness of the third area at an outermost portion is equal to the reference thickness T of the plate, and the circular-shaped first area is formed such that a thickness T1 of the first area is less than 0.6 times the thickness t of the cylinder wall. In the present invention, the "reference thickness T" of the plate is a basic thickness given to the plate in the basic design of the cabinet. In the preliminary design phase of the cabinet, the "reference thickness T" is determined in view of the required strength of the outer plate in priority to the detailed design phase of the structure of the cylindrical boss forming place of the cabinet.

In the above structure, the thickness t1 of the innermost portion of the peripheral third area is equal to the thickness t of the cylinder wall at a base end (a root) of the boss (t1=t). This relationship does not seem to satisfy the relationship of the formula (1) which is illustrated with reference to FIG. 4. However, in the above structure, the thickness T1 of the circular-shaped first area satisfies the relationship of T1<t× 0.6. That is, the circular-shaped first area can be interpreted as a rib member which stands from the ring-shaped second area having the thickness equal to the thickness t of the cylinder wall at the base end of the cylindrical boss (or the thickness of the innermost portion of the peripheral third area), and the thickness T1 of the circular-shaped first area is less than 0.6 times the base end thickness t of the cylinder wall (T1<t×0.6). Thus, the thickness T1 of the circular-shaped first area is much thinner than the innermost thickness t1 of the peripheral third area. As a result, during the injection molding, the cooling speed of the resin in the connecting portion of the cylinder wall at the base end of the cylindrical boss and the ring-shaped second area of the plate is similar to the cooling speed around the connecting portion, and the local contraction of the resin hardly occurs, whereby the occurrence of the sink on the front surface of the place at the cylindrical boss forming place is suppressed or prevented. Therefore even in the cabinet with a high gloss front surface, the sink may become unnoticeable on the front surface of the cabinet and the deterioration of the external appearance quality hardly occurs. Here, the "molding process" includes a plurality of steps from the resin injection into the mold to the cooling process after the mold separation.

A tapered face may be formed on the second face of the plate such that the thickness of the third area increased from the inside to the outside. With this structure, the occurrence of the sink can be suppressed or prevented only by changing a shape of the back surface of the plate, which is not visible externally into a bowl shape in the peripheral third area. Accordingly, it is not necessary to change an external (front surface) design of the cabinet.

The thickness T1 of the first area may be less than a value obtained by multiplying 0.9 by 0.6 times the thickness t of the cylinder wall. With this structure, since the safety margin become high when the formula (1) is satisfied, it is possible to reliably suppress or prevent the occurrence of the sink.

The thickness T1 of the first area may be not less than 1 mm regardless of the thickness of the innermost portion of the third area. This structure is advantageous in giving the required strength to the circular-shaped first area of the plate. The thickness of the innermost portion of the third area may be not less than 1.5 mm.

According to another aspect of at least one embodiment of the present invention, there is provided a cabinet, comprising: a resin-molded plate having a first face which is flat and a second face which is opposite to the first face; and a resin-molded boss formed into a cylindrical shape and integrally protruded from the second face of the plate, wherein: a thickness t of a cylinder wall at a base end of the boss is less than a reference thickness T of the plate, and when the plate is divided into a circular-shaped first area partly defining an inner space of the cylindrical boss, a ring-shaped second area disposed around the first area so as to correspond to the cylinder wall and a peripheral third area disposed so as to surround the second area, the peripheral third area is formed such that a thickness of the third area at an innermost portion is equal to the thickness t of the cylinder wall, the thickness of the third area increases from the inside to the outside, and the thickness of the third area at an outermost portion is equal to the reference thickness T of the plate, and the circular-shaped first area is formed such that a thickness T1 of the first area is less than 0.6 times the thickness t of the cylinder wall.

As described above, according to an aspect of at least one embodiment of the present invention, it is possible to suppress or prevent the occurrence of the sink on the surface of the plate in the cylindrical boss forming place by design. As a result, even in a thin cabinet with a high gloss front surface, it is possible to provide a structure of the cylindrical boss forming place of the cabinet in which the sink is not noticeable on the front surface of the cabinet.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the invention will be described with reference to the accompanying drawings.

Figure 1:
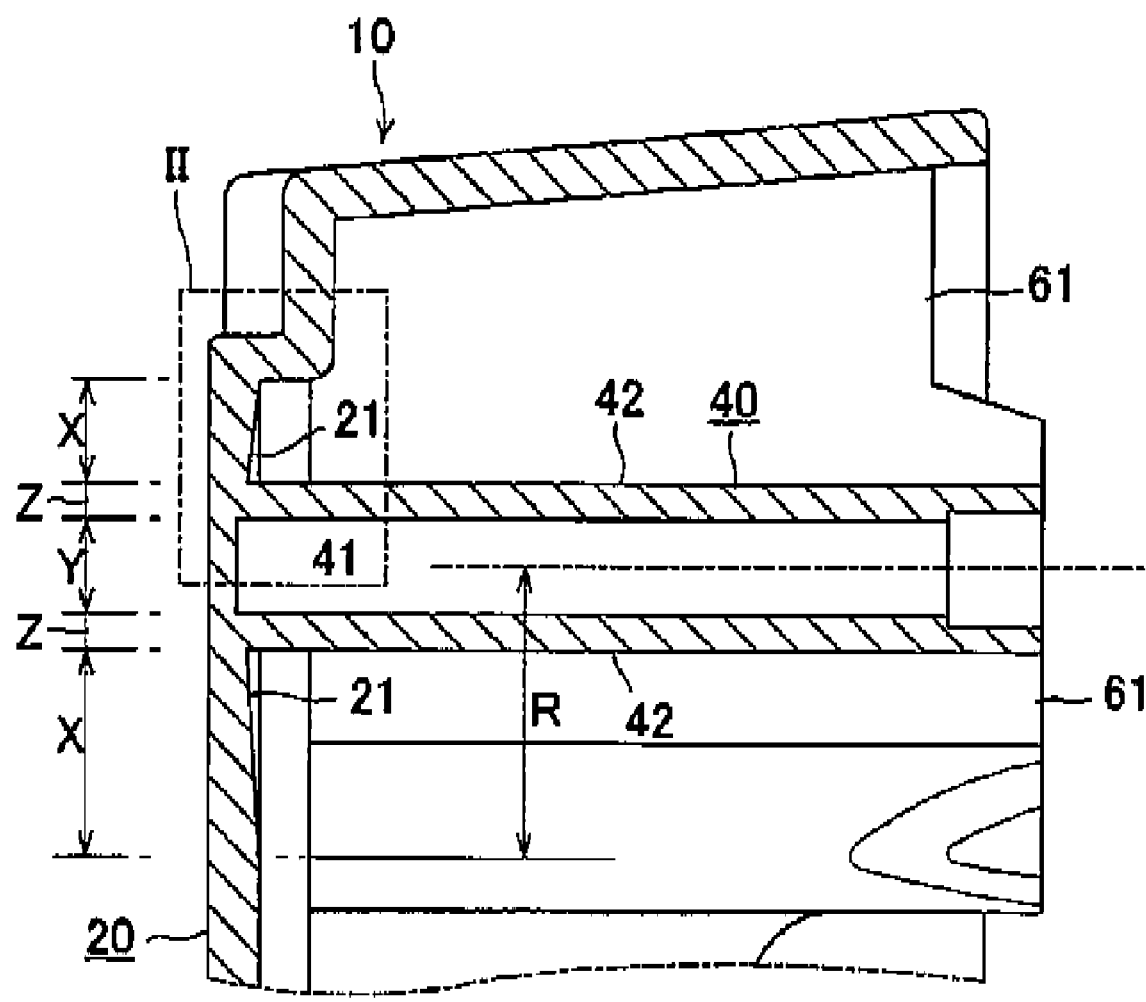
FIG. 1 is a longitudinal sectional view illustrating a cylindrical boss forming place of a front panel according to an embodiment of the present invention.
Figure 2:
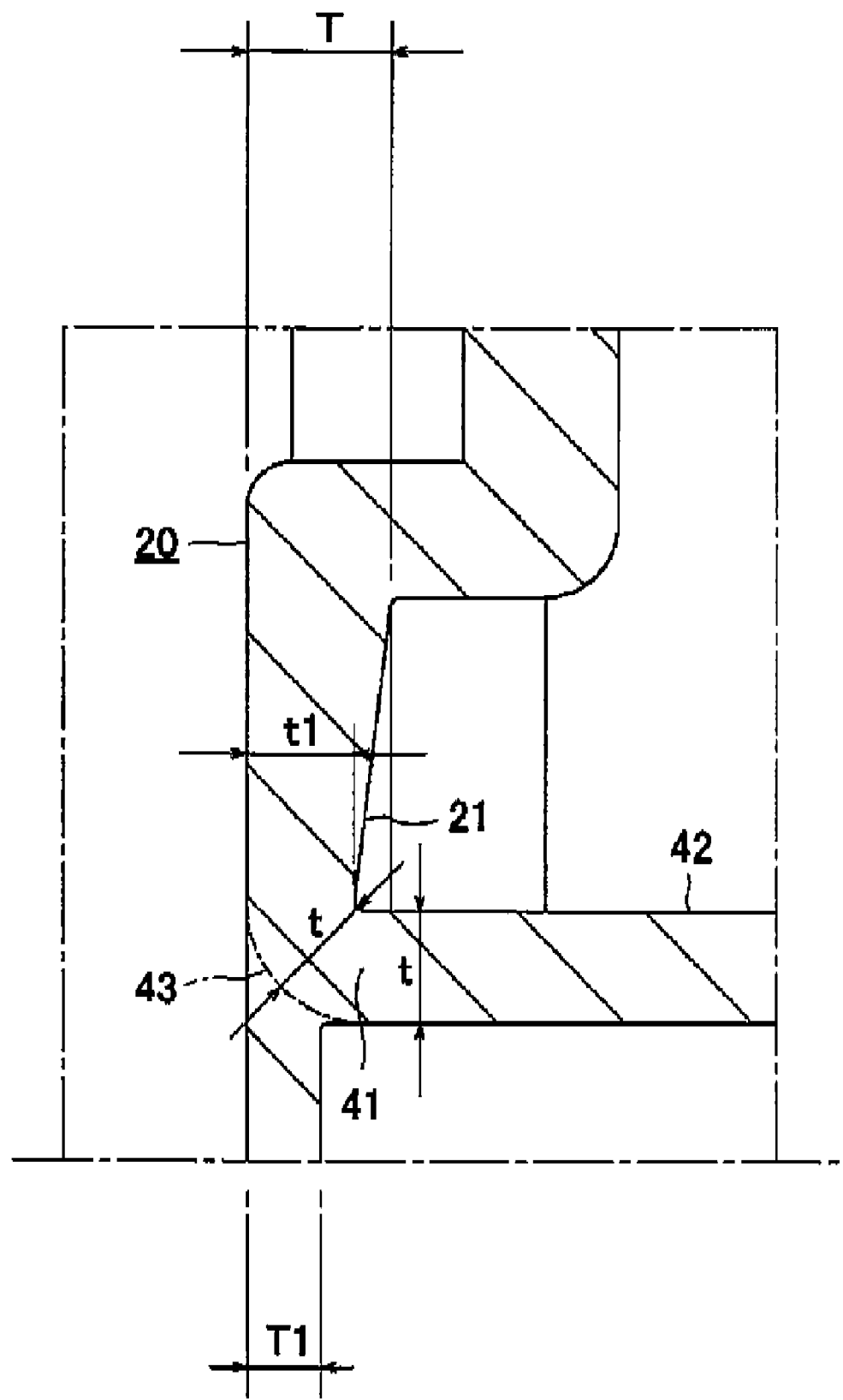
FIG. 2 is an enlarged sectional view illustrating the part II shown in FIG. 1.

A front panel 10 which constitutes a part of a cabinet of a television receiver is shown in FIGS. 1 and 2. The front panel 1 includes an outer plate 20 having a front surface which is visible in use and a back surface which is not visible as seen from the outside, and a cylindrical boss 40 which stands on the back surface at a right angle at a corner portion of the outer plate 20. The cylindrical boss 40 is used for fixing a CRT with a screw. In addition, a plate piece-shaped rib 61 stands radially around the cylindrical boss 40. The outer plate 20, the cylindrical boss 40, and ribs 61 are made of resin and integrally formed by means of an injection molding. In this embodiment, a place where the cylindrical boss 40 is formed and a peripheral area thereof are referred to as "a cylindrical boss forming place".

As shown in FIG. 2, in the cylindrical boss forming place, the thickness t of the cylinder wall 42 of a base end (a root) 41 of the cylindrical boss 40 is set to be thinner than the reference thickness T of the outer plate 20 (t<T). Here, the reference thickness T of the outer plate 20 is a thickness sufficient to provide a required strength for the outer plate 20 of the front panel 10 in the television receiver, and it is the basic thickness that is set during the preliminary design phase of the front panel 10 of the cabinet.

Figure 3:
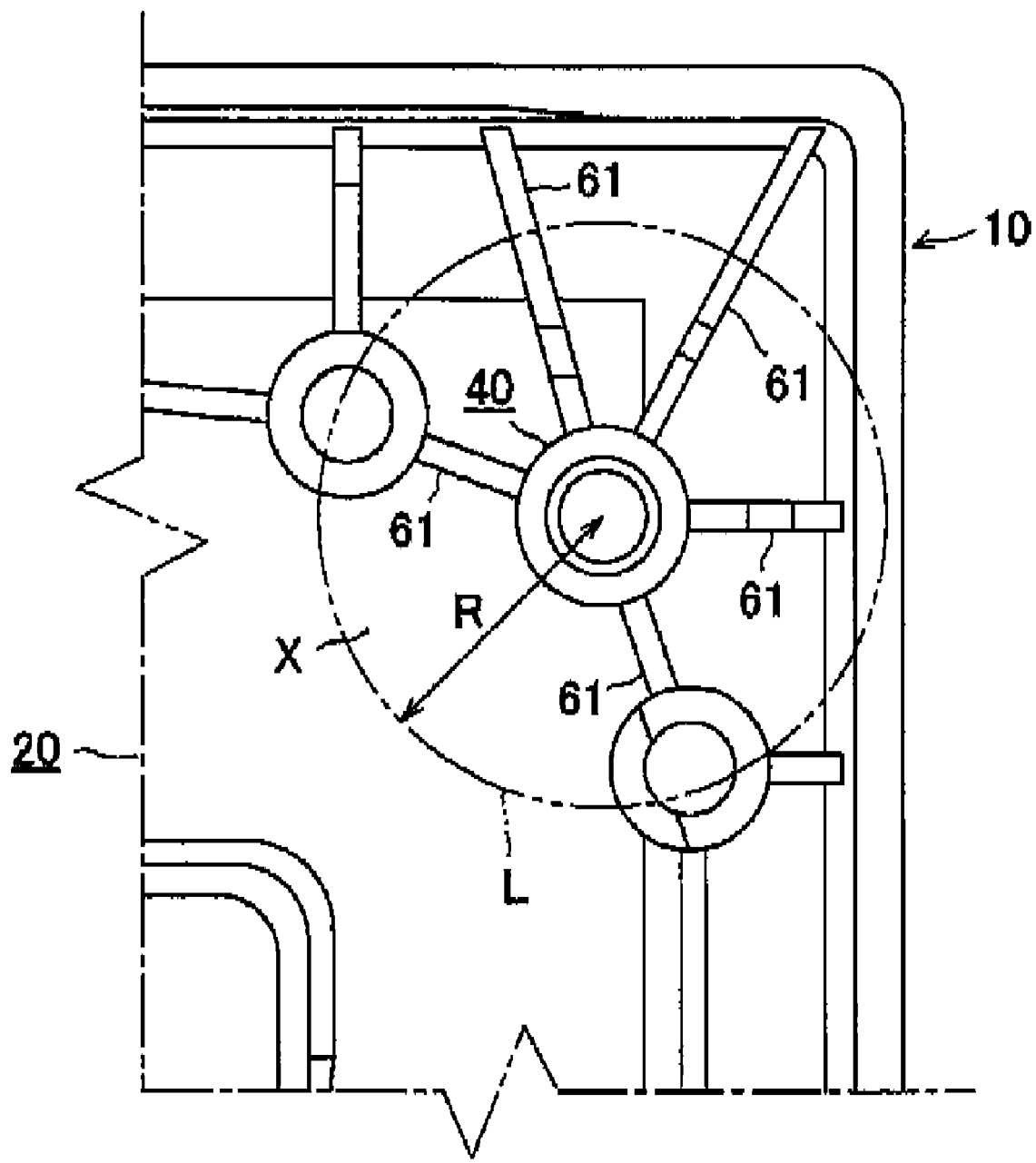
FIG. 3 is a rear view illustrating the cylindrical boss forming place of the front panel according to the embodiment.

The front surface of the outer plate 20 is flat surface. This surface may be glossy coated. As shown in FIG. 1, for the sake of convenience, the outer plate 20 can be divided into a peripheral area X disposed around the base end 41 of the cylindrical boss 40, a circular-shaped area Y closing an opening of the cylindrical boss 40 to define an inner space of the cylindrical boss 40 with the cylinder wall 42, and a ring-shaped area Z positioned between the peripheral area X and the circular-shaped area Y so as to correspond to the cylinder wall 42 of the cylindrical boss 40. Therefore, the ring-shaped area Z is disposed around the circular-shaped area Y and the peripheral area X surrounds the ring-shaped area Z. In the illustrated embodiment, an outer outline of the peripheral area X illustrated by an imaginary line (a chain double-dashed line) L shown in FIG. 3 is indicated by a circle of a radius R with its center on the central axis of the cylindrical boss 40.

When the outer plate 20 is divided into the peripheral area X, the circular-shaped area Y, and the ring-shaped area Z, each of the areas has the following structure.

Namely, as shown in FIGS. 1 and 2, the thickness of the innermost circumference portion of the peripheral area X, that is to say, the innermost thickness t1 of the peripheral area X is equal to the thickness t of the cylinder wall 42 at the base end 41 of the cylindrical boss 40 (t1=t). The thickness of the peripheral area X gradually increases as it extends from the inner circumference to the outer circumference. And the thickness of the outermost circumference portion of the peripheral area X, that is to say, the outermost thickness of the peripheral area X is equal to the reference thickness T of the outer plate 20. In this embodiment, in order not to affect the shape of the flat front surface of the outer plate 20, a tapered surface 21 is formed on the back surface of the outer plate 20 to change the thickness of the peripheral area X. Further, the thickness T1 of the circular-shaped area Y is less than 0.6 times the thickness t of the cylinder wall (T1<t×0.6).

With this structure, in the ring-shaped area Z of the outer plate 20 in which the sink may easily occur, the occurrence of the sink on the front surface of the outer plate 20 can be suppressed.

Figure 4:
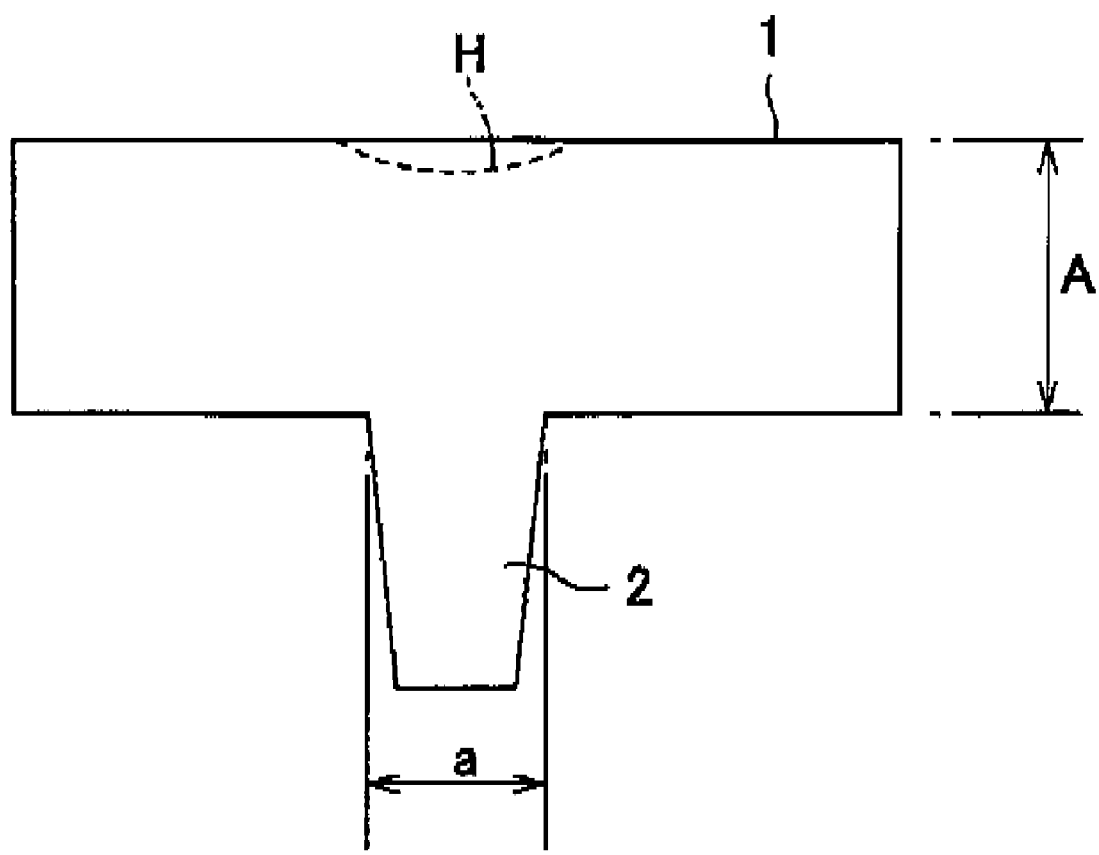
FIG. 4 is an explanatory diagram illustrating a resin molded product in which a rib stands on a back surface of a base plate.

This may be because the following reason. That is, the innermost thickness t1 of the peripheral area X is equal to the thickness t of the cylinder wall 42 (t1=t), the relationship of t1=t does not satisfy the relationship of a<0.6×A in the formula (1) which is explained with reference to FIG. 4. The thickness T1 of the circular-shaped area Y, however, satisfies the relationship of T1<t×0.6. That is, the circular-shaped area Y corresponds to a rib member protruding from the connecting portion 43 which has a thickness equal to the thickness t of the cylinder wall 42 and connects the peripheral area X and base end 41 of the cylinder wall 42 in the ring-shaped area Z, and the thickness T1 of the circular-shaped area Y is less than 0.6 times the thickness t of the cylinder wall 42 at the base end 41 of the cylindrical boss 40 (T1<t×0.6). The thickness T1 of the circular-shaped area Y is much thinner than the innermost thickness t1 of the peripheral area X. As a result, during the injection molding process, the cooling speed of the resin in the connecting portion 43 is similar to the cooling speed in an area around the connecting portion 43, and local contraction of the resin hardly occurs. Thus, the occurrence of the sink on the front surface of the cylindrical boss forming place of the outer plate 20 can be controlled, or the occurrence of the sink can be prevented.

In this embodiment, when the peripheral area X, the circular-shaped area Y and the ring-shaped area Z of the outer plate 20 are configured as described above, the occurrence of the sink on the front surface of the cylindrical boss forming place of the outer plate 20 can be controlled or prevented. For example, when the thickness T1 of the circular-shaped area Y does not satisfy the relationship of T1<t×0.6, even if the relationship of t1=t is satisfied, the occurrence of the sink on the front surface of the cylindrical boss forming place of the outer plate 20 is not prevented.

It is desirable that the thickness T1 of the circular-shaped area Y is less than a value obtained by multiplying 0.9 by the value of 0.6 times the base end thickness t of the cylinder wall 42 (T1<t×0.6×0.9). According to this structure, since the safety margin become high when the relationship corresponding to the formula (1) is satisfied, it is possible to reliably suppress or prevent the occurrence of the sink to that extent. In this case, it is necessary to guarantee the minimum thickness of the circular-shaped area Y to provide the strength required for the circular-shaped area Y. For example, it is desirable that the thickness T1 of the circular-shaped area Y is not less than 1 mm regardless of the innermost thickness t1 of the peripheral area X. This structure is advantageous in giving the required strength to the circular-shaped area Y of the outer plate 20 of the front panel 10. The innermost thickness t1 of the of the peripheral area X is not less than 1.5 mm to fulfill the required strength.

Hereinafter, a specific example will be described.

In the cylindrical boss forming place shown in FIG. 1, when the thickness t of the cylinder wall 42 at the base end 41 of the cylindrical boss 40 is 2.3 mm and the reference thickness T of the outer plate 20 is 3 mm, the radius R of the peripheral area X of the outer plate 20 is 10 mm, the thickness t1 of the innermost circumference portion of the peripheral area X of the outer plate 20 is set to be 2.3 mm which is equal to the thickness t of the cylinder wall, and the thickness T1 of the circular-shaped area Y of the outer plate 20 is set to be equal to or less than 1.38 mm. With this configuration, the sink is not noticeable on the front surface (with high gloss) of the outer plate 20 at the cylindrical boss forming place. Here, the thickness T1 of the circular-shaped area Y corresponds to a value which is less than a value calculated by T1=t×0.6. In addition, at the place where a step portion is provided on the outer plate 20, the above-described peripheral area X is defined within the range from the center of the cylindrical boss to its step part (see FIGS. 1 and 3).

Further, in order to add a safety margin to the condition that the sink does not occur, when the thickness T1 of the circular-shaped area Y is indicated by the value calculated by T1<t× 0.6×0.9, the value of T1 is equal to or less than about 1.2 mm. Thus, when the value of T1 at the time of satisfying the required strength of the circular-shaped area Y is equal to or more than 1 mm, the relationship of 1 mm<T1<1.2 mm can be obtained.

Thus, when the thickness t of the cylinder wall 42 at the base end 41 of the cylindrical boss 40 is 2.3 mm and the reference thickness T of the outer plate 20 is 3 mm, if the innermost thickness t1 of the peripheral area X is set to be 2.3 mm and the thickness T1 of the circular-shaped area Y is set to be 1 mm<T1<1.2 mm, the sink is not noticeable on the front surface of the outer plate 20.

This specific example is one example and the numerical values indicated therein are also one example, therefore the present invention is not limited to these numerical values.

What is claimed is:

1. A structure of a cylindrical boss forming place of a cabinet, the structure comprising:

a resin-molded plate having a first face which is flat and a second face which is opposite to the first face; and a resin-molded boss formed into a cylindrical shape and integrally protruded from the second face of the plate, wherein:

a thickness t of a cylinder wall at a base end of the boss is less than a reference thickness T of the plate, and when the plate is divided into a circular-shaped first area partly defining an inner space of the cylindrical boss, a ring-shaped second area disposed around the first area so as to correspond to the cylinder wall and a peripheral third area disposed so as to surround the second area, the peripheral third area is formed such that a thickness of the third area at an innermost portion is equal to the thickness t of the cylinder wall, the thickness of the third area increases from the inside to the outside, and the thickness of the third area at an outermost portion is equal to the reference thickness T of the plate, and the circular-shaped first area is formed such that a thickness T1 of the first area is less than 0.6 times the thickness t of the cylinder wall.

2. The structure as set forth in claim 1, wherein a tapered face is formed on the second face of the plate such that the thickness of the peripheral third area increased from the inside to the outside.

3. The structure as set forth in claim 1, wherein the thickness T1 of the first area is less than a value obtained by multiplying 0.9 by 0.6 times the thickness t of the cylinder wall.

4. The structure as set forth in claim 1, wherein the thickness T1 of the first area is not less than 1 mm regardless of the thickness of the innermost portion of the third area.

5. The structure as set forth in claim 1, wherein the thickness of the innermost portion of the third area is not less than 1.5 mm.

* * * * *